United States Patent
Parsons et al.

(10) Patent No.: US 11,256,999 B2
(45) Date of Patent: Feb. 22, 2022

(54) METHODS AND SYSTEMS OF FORECASTING THE DRYING OF AN AGRICULTURAL CROP

(71) Applicant: Deere & Company, Moline, IL (US)

(72) Inventors: Stephen K. Parsons, Moline, IL (US);
Joshua D. Graeve, Moline, IL (US);
David V. Rotole, Bloomfield, IA (US);
Kellen B. Hill, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 1217 days.

(21) Appl. No.: 15/686,687

(22) Filed: Aug. 25, 2017

(65) Prior Publication Data
US 2018/0121821 A1 May 3, 2018

Related U.S. Application Data

(60) Provisional application No. 62/414,508, filed on Oct. 28, 2016.

(51) Int. Cl.
*G06N 7/00* (2006.01)
*A01D 91/04* (2006.01)
*G06N 20/00* (2019.01)

(52) U.S. Cl.
CPC .............. *G06N 7/005* (2013.01); *A01D 91/04* (2013.01); *G06N 20/00* (2019.01)

(58) Field of Classification Search
CPC ......... G06N 7/005; G06N 20/00; A01D 91/04
See application file for complete search history.

(56) References Cited

U.S. PATENT DOCUMENTS 6,671,698 B2   12/2003   Pickett et al.
9,009,087 B1   4/2015    Mewes et al.
(Continued)

FOREIGN PATENT DOCUMENTS

CN    102893817    1/2013
WO    2010/003421   1/2010
WO    2017/074692   5/2017

OTHER PUBLICATIONS

EP17197928.9 Extended European Search Report dated Mar. 2, 2018 (7 pages).

(Continued)

*Primary Examiner* — Hal Schnee
(74) *Attorney, Agent, or Firm* — Michael Best & Friedrich LLP

(57) ABSTRACT

A system for forecasting the drying of an agricultural crop includes an electronic processor configured to receive weather data associated with an agricultural field and receive an agricultural field parameter from a field sensor associated with the agricultural field. The electronic processor is also configured to determine a drying score for each of a plurality of harvest times based on the weather data and the agricultural field parameter. The electronic processor is also configured to determine a recommended harvest time for harvesting the agricultural crop based on the drying score, wherein the recommended harvest time is included in the plurality of harvest times. The electronic processor is also configured to output a forecast for the agricultural crop for display to a user, wherein the forecast includes the drying score and the recommended harvest time for harvesting the agricultural crop.

20 Claims, 5 Drawing Sheets

(56) References Cited

U.S. PATENT DOCUMENTS

| | | | |
|---|---|---|---|
| 9,131,644 B2 | 9/2015 | Osborne | |
| 9,140,824 B1 * | 9/2015 | Mewes et al. | |
| 9,519,861 B1 * | 12/2016 | Gates | A01C 21/007 |
| 9,880,140 B2 * | 1/2018 | Osborne | A01G 7/00 |
| 2016/0078570 A1 * | 3/2016 | Ethington | G06Q 10/06 |
| | | | 705/7.21 |
| 2016/0217231 A1 * | 7/2016 | Mewes | G06F 30/20 |
| 2018/0181893 A1 * | 6/2018 | Basso | G06Q 50/02 |

OTHER PUBLICATIONS

Rotz et al., "Alfalfa drying model for the field environment," publication (1985) Transactions of the ASAE, vol. 28, No. 5, pp. 1686-1691.

Rotz et al., "Alfalfa drying, loss and quality as influenced by mechanical and chemical conditioning," publication (1987) Transactions of the ASAE vol. 30, No. 3. pp. 630-635.

Rotz et al., "DAFOSYM: A Model of the Dairy Forage System," publication (published May 1, 2013) J. Prod. Agric., vol. 2, No. 1, pp. 83-91 (1989).

\* cited by examiner

METHODS AND SYSTEMS OF FORECASTING THE DRYING OF AN AGRICULTURAL CROP

RELATED APPLICATIONS

The present application claims priority to U.S. Provisional Application No. 62/414,508, filed Oct. 28, 2016, the entire contents of which is hereby incorporated by reference.

FIELD

Embodiments described herein relate to methods and systems of forecasting the drying of an agricultural crop, such as hay.

SUMMARY

In most climates, providing a dry agricultural crop, such as hay, involves a lot of risk due to the limited and variable time periods between rains and the large variation in drying rates at any given time. Commonly available tools, such as local weather forecasts, may aid in estimating a time period between rains at a given time and location. However, there are no commonly available tools for forecasting how fast an agricultural crop will dry at a given time and location. Such a drying forecast tool may mitigate the risks involved in providing a dry agricultural crop and may improve the chances of successfully providing a dry agricultural crop.

Accordingly, embodiments described herein relate to forecasting the drying of an agricultural crop. For example, one embodiment provides a system for forecasting the drying of an agricultural crop. The system includes an electronic processor configured to receive weather data associated with an agricultural field and receive an agricultural field parameter from a field sensor associated with the agricultural field. The electronic processor is also configured to determine a drying score for each of a plurality of harvest times based on the weather data and the agricultural field parameter. The electronic processor is also configured to determine a recommended harvest time for harvesting the agricultural crop based on the drying score, wherein the recommended harvest time is included in the plurality of harvest times. The electronic processor is also configured to output a forecast for the agricultural crop for display to a user, wherein the forecast includes the drying score and the recommended harvest time for harvesting the agricultural crop.

Another embodiment provides a method for forecasting the drying of an agricultural crop. The method includes receiving, with an electronic processor, weather data associated with an agricultural field and receiving, with the electronic processor, an agricultural field parameter from a field sensor associated with the agricultural field. The method also includes determining, with the electronic processor, a drying score for each of a plurality of harvest times based on the weather data and the agricultural field parameter. The method also includes determining, with the electronic processor, a recommended harvest time for harvesting the agricultural crop based on the drying score, wherein the recommended harvest time is included in the plurality of harvest times. The method also includes outputting, with the electronic processor, a forecast of the agricultural crop for display to a user, wherein the forecast includes the drying score and the recommended harvest time for harvesting the agricultural crop. The method also includes harvesting the agricultural crop at the recommended harvest time based on the forecast.

Yet another embodiment provides a method for forecasting the drying of an agricultural crop. The method includes receiving, with an electronic processor, weather data associated with an agricultural field and an agricultural field parameter from a field sensor associated with the agricultural field. The method also includes determining, with the electronic processor, a drying score for each of a plurality of harvest times based on the weather data and the agricultural field parameter. The method also includes determining, with the electronic processor, a recommended harvest time for harvesting the agricultural crop based on the drying score, wherein the recommended harvest time is included in the plurality of harvest times. The method also includes outputting, with the electronic processor, a forecast of the agricultural crop for display to a user, wherein the forecast includes the drying score and the recommended harvest time for harvesting the agricultural crop. The method also includes harvesting the agricultural crop at the recommended harvest time based on the forecast of the agricultural crop.

Other aspects of various embodiments will become apparent by consideration of the detailed description and accompanying drawings.

DETAILED DESCRIPTION

Figure 1:
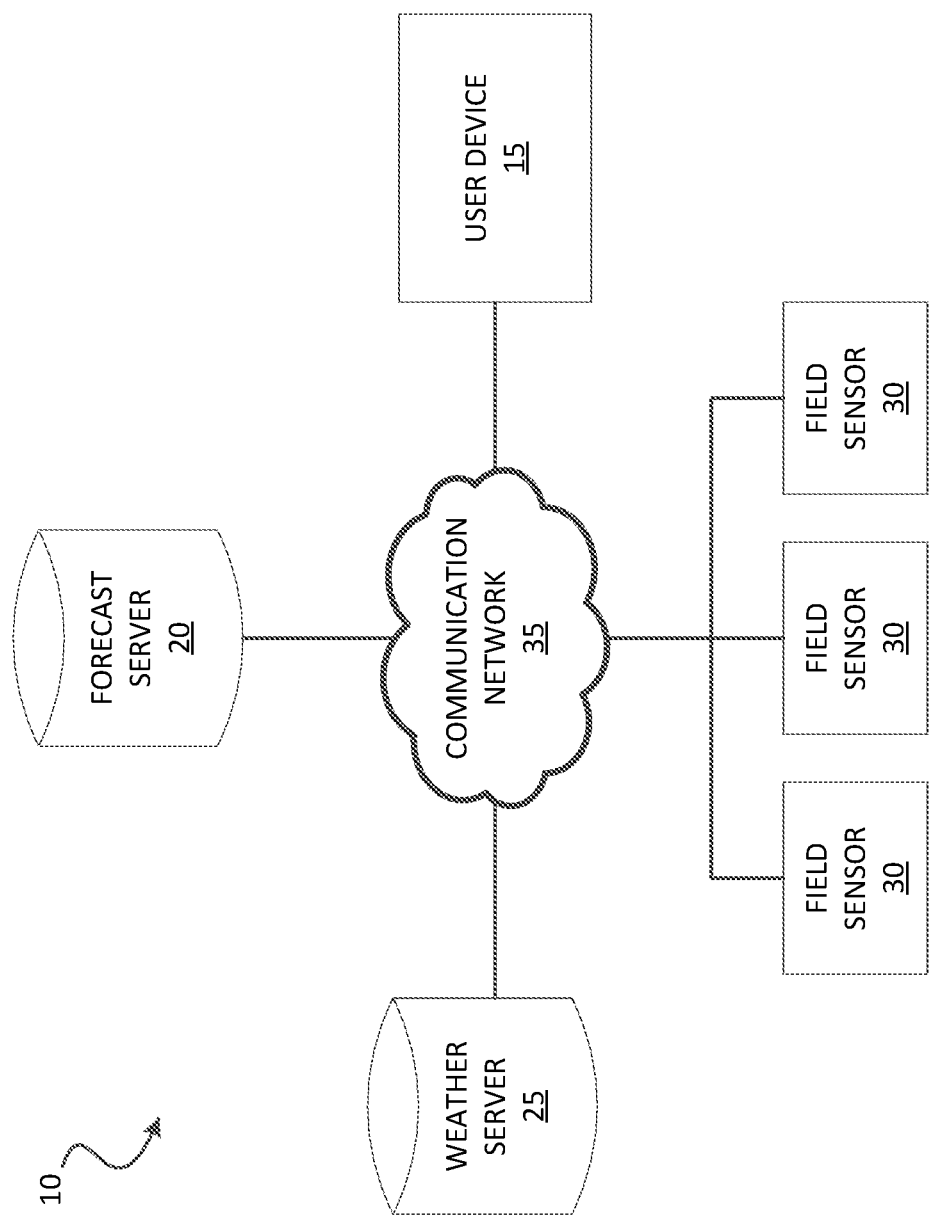
FIG. 1 schematically illustrates a system for forecasting the drying of an agricultural crop according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

For some agricultural crops, it is preferable to harvest when the agricultural crop is at a certain level of dryness (i.e., not wet from rain or dew). In some climates, providing and harvesting a dry agricultural crop, such as hay, involves risk due to the limited and variable time periods between rains and variations in drying rates at any given time. Commonly available tools, such as local weather forecasts, may aid in estimating a time period between rains at a given time and location. However, there are no commonly available tools for forecasting how fast an agricultural crop will dry at a given time and location. Such a drying forecast tool may mitigate the risks involved in providing a dry agricultural crop and may improve the chances of successfully providing a dry agricultural crop.

Accordingly, some examples and implementations described herein relate to forecasting the drying of an agricultural crop. For example, a user may interact with a forecasting application to provide and receive information relating to the drying of an agricultural crop. The forecasting application may receive one or more agricultural field parameters, such as moisture level, wind speed, soil type, crop type, and the like, relating to an agricultural field. As described in greater detail below, the agricultural field parameter may be received from the user (via a user device), a field sensor, or a combination thereof. The forecasting application may also receive weather data, such as a local weather forecast. Based on the received information, the forecasting application may provide information relating to the drying of an agricultural crop, such as a drying score, to the user (for example, a forecast).

In some implementations, the system is configured to be used by a user for planning when to begin harvesting an agricultural crop. The system is configured to calculate a drying score for each of a plurality of "times" on one or more days. The drying score for a particular time is indicative of the relative chances that the agricultural crop will be sufficiently dry if harvesting is begun at the corresponding time. For example, the calculated drying score may be indicative of an estimated pre-harvest rate of drying for the agricultural crop since a previous rainfall and the duration of a period of time between the forecasted end of the previous rainfall and the corresponding harvest time. In other words, the drying score is indicative of how dry the agricultural crop will be at a given time of day if it dries at a predicted rate of drying for a forecasted period of time. In other words, a user may use the drying score for planning when to harvest an agricultural crop in order to ensure the agricultural crop is dry when harvested. In some implementations, the drying score is also indicative of a chance that the agricultural crop will remain dry until harvesting is complete (e.g., if harvesting is begun at a particular time, how likely is it that the harvesting will be completed before the next predicted rainfall begins?).

FIG. 1 illustrates a system 10 of forecasting the drying of an agricultural crop, such as hay, in accordance with some embodiments. In the example illustrated in FIG. 1, the system 10 includes a user device 15, a forecast server 20, a weather server 25, and a plurality of field sensors 30 (referred to herein collectively as "the field sensors 30" and individually as "a field sensor 30"). In some embodiments, the system 10 includes fewer, additional, or different components than those illustrated in FIG. 1 in various configurations and may perform additional functionality than the functionality described herein. For example, the system 10 may include multiple user devices 15, multiple forecast servers 20, and multiple weather servers 25. Alternatively or in addition, in some embodiments, the forecast server 20 and the weather server 25 are combined into a single device.

The user device 15, the forecast server 20, the weather server 25, and the field sensors 30 communicate over one or more wired or wireless communication networks 35. Portions of the communication network 35 may be implemented using a wide area network, such as the Internet, a local area network, such as a Bluetooth™ network or Wi-Fi, and combinations or derivatives thereof. It should be understood that in some embodiments, additional communication networks are used to allow one or more components of the system 10 to communicate. Also, in some embodiments, components of the system 10 communicate directly as compared to through the communication network 35 and, in some embodiments, the components of the system 10 communicate through one or more intermediary devices not shown in FIG. 1.

The weather server 25 stores and manages weather data, such as local weather forecasts, anticipated precipitation data, cloud coverage data, solar radiation data, wind speed data, and the like. For example, the weather server 25 may be maintained and managed by a weather organization or service, such as the National Weather Service. Although not illustrated in FIG. 1, the weather server 25 may include an electronic processor (for example, a microprocessor, an application-specific integrated circuit (ASIC), or another suitable electronic device), a memory (for example, a non-transitory, computer-readable storage medium), and a communication interface, such as a transceiver, for communicating over the communication network 35 and, optionally, one or more additional communication networks or connections. It should be understood that the weather server 25 may include additional components in various configurations and may perform additional functionality than the functionality described herein. For example, the functionality described herein as being performed by the weather server 25 may be distributed among multiple servers or devices collectively referred to as the weather server. Alternatively or in addition, as noted above, the weather server 25 may be included in the forecast server 20.

The field sensors 30 are configured to detect one or more agricultural field parameters. The agricultural field parameters are associated with one or more agricultural fields. The agricultural field parameters include, for example, moisture, solar radiation, cloud coverage, humidity, wind speed, and the like. Accordingly, the field sensors 30 may include a humidity sensor, a moisture sensor, a temperature sensor, a wind sensor, a light sensor, a soil sensor, another type of agricultural field sensor, or a combination thereof. In some embodiments, the field sensors 30 are positioned at various locations associated with an agricultural field. For example, the field sensors 30 may be positioned on a soil surface of an agricultural field, below the soil surface of an agricultural field, at a predetermined height above the soil surface of an agricultural field, or a combination thereof. For example, a wind sensor may be positioned at a predetermined height about the soil surface while a moisture sensor may be positioned on or below the soil surface.

Alternatively or in addition, in some embodiments, a field sensor 30 is positioned on a mobile monitoring device. The mobile monitoring device may be configured to monitor one or more agricultural fields. The mobile monitoring device may be an aerial monitoring vehicle, such as a drone, or a surface monitoring vehicle. The mobile monitoring device may be manually controlled by a user (for example, via the user device 15), autonomously controlled, or a combination thereof. In some embodiments, more than one field sensor 30 is positioned on the mobile monitoring device. Alternatively or in addition, more than one mobile monitoring device may be used with the system 10. For example, a humidity sensor may be positioned on an aerial monitoring vehicle while a temperature sensor and a moisture sensor may be positioned on one or more surface monitoring vehicles.

The user device 15 includes, for example, one or more desktop computers, laptop computers, tablet computers, terminals, smart telephones, smart televisions, smart wearables, server databases, other types of computing devices, or a combination thereof. The user device 15 may be used by a user, such as a farmer of an agricultural field, to interact with a forecast application. For example, as described in more detail below, the user device 15 may provide a forecast for an agricultural field through the forecast application displayed on the user device 15.

Figure 2:
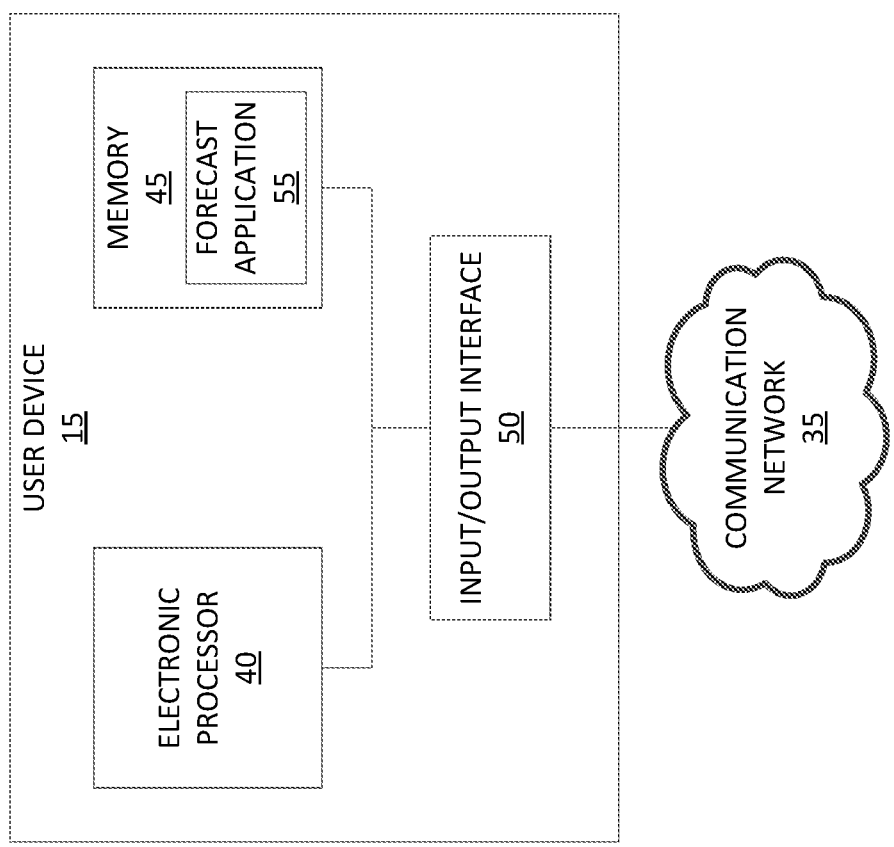
FIG. 2 schematically illustrates a computing device included in the system of FIG. 1 according to some embodiments.

FIG. 2 schematically illustrates the user device 15 according to some embodiments. As illustrated in FIG. 2, the user device 15 includes an electronic processor 40 (for example, a microcontroller, an application-specific integrated circuit (ASIC), or another suitable electronic device), a memory 45 (for example, a non-transitory, computer-readable storage medium), and a communication interface 50, such as a transceiver that communicates with the forecast server 20, the field sensors 30, the weather server 25, or a combination thereof over the communication network 35 and, optionally, one or more other communication networks or connections. The electronic processor 40, the memory 45, and the communication interface 50 communicate wirelessly, over one or more communication lines or buses, or a combination thereof. It should be understood that the user device 15 may include additional components than those illustrated in FIG. 2 in various configurations. For example, in some embodiments, the user device 15 also includes one or more input devices (for example, a keyboard, a keypad, a mouse, a joystick, a touchscreen, and the like) and one or more output devices (for example, a display device, a touchscreen, a printer, a speaker, and the like) that receive input from a user and provide output to a user. It should also be understood that the user device 15 may perform additional functionality than the functionality described herein. For example, in some embodiments, the functionality described as being performed by the user device 15 may be distributed among multiple user devices 15, may be performed by the forecast server 20, the weather server 25, or a combination thereof.

The electronic processor 40 is configured to retrieve instructions and data from the memory 45 and execute, among other things, instructions to perform a set of functions, including the methods described herein. For example, as illustrated in FIG. 2, in some embodiments, the memory 45 stores a forecast application 55. In some embodiments, the forecast application 55 is stored remotely from the user device 15, such as at the weather server 25, the forecast server 20, or another remote device. The forecast application 55 is executable by the electronic processor 40 to perform a set of functions including the methods described herein. In some embodiments, the forecast application 55, when executed by the electronic processor 40, generates a plurality of user interfaces displayed on the user device 15 (for example, via an output device of the user device 15). In some embodiments, the displayed user interfaces include a forecast associated with one or more agricultural fields to the user of the user device 15.

The forecast displayed to the user may include information relating to the drying of an agricultural crop planted in one or more agricultural fields. For example, as described in greater detail below, the forecast may include a drying score, a recommended harvest time for harvesting an agricultural crop, a user-selected harvest time, a recommended time for performing post-harvest activities (for example, raking and baling), a cumulative drying score, a dry period, and the like. Additionally, in some embodiments, the forecast also includes a probability of success associated with the information included in the forecast. For example, the forecast may include a probability of success for the recommended harvest time, for the user-selected harvest time, for a plurality of harvest times, and the like. Accordingly, the information included in the forecast serves as a resource to the user of the forecast application 55 in deciding, for example, when to harvest an agricultural crop.

Figure 3:
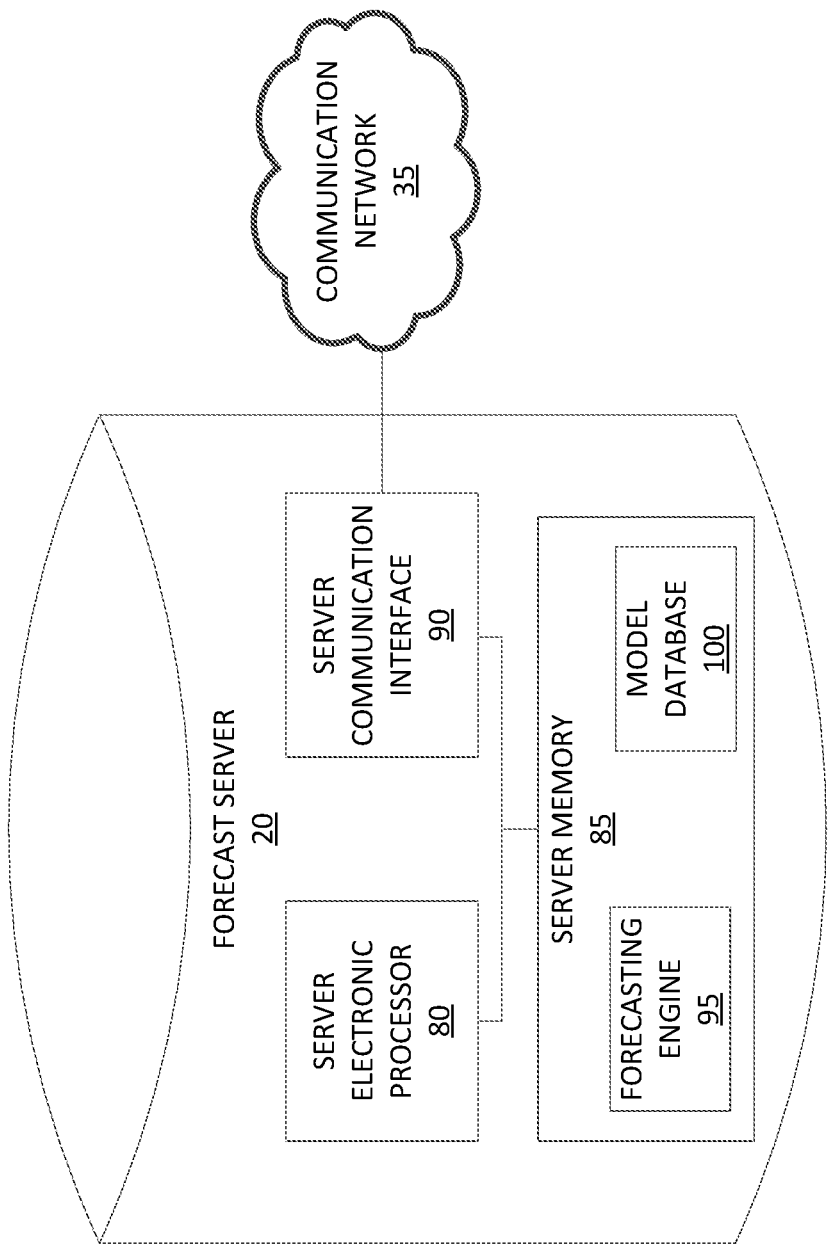
FIG. 3 schematically illustrates a forecast server included in the system of FIG. 1 according to some embodiments.

FIG. 3 schematically illustrates the forecast server 20 according to some embodiments. As illustrated in FIG. 3, the forecast server 20 includes a server electronic processor 80 (for example, a microprocessor, an application-specific integrated circuit (ASIC), or another suitable electronic device), a server memory 85 (for example, one or more non-transitory computer-readable storage mediums), and a server communication interface 90, such as a transceiver that communicates with the user device 15, the field sensors 30, the weather server 25, or a combination thereof over the communication network 35 and, optionally, one or more other communication networks or connections. The server electronic processor 80, the server memory 85, and the server communication interface 90 communicate wirelessly, over one or more data connections or buses, or a combination thereof. The forecast server 20 illustrated in FIG. 3 represents one example, and, in some embodiments, the forecast server 20 includes fewer, additional, or different components in different configurations than illustrated in FIG. 3. Also, in some embodiments, the forecast server 20 performs functionality in addition to the functionality described herein. Additionally, as noted above, in some embodiments, the forecast server 20 and the weather server 25 are included in a single server. In some embodiments, the functionality of the forecast server 20 as described herein may be implemented via the user device 15.

The server electronic processor 80 is configured to retrieve instructions and data from the server memory 85 and execute, among other things, instructions to perform a set of functions, including the methods described herein. For example, as illustrated in FIG. 3, in some embodiments, the server memory 85 stores a forecasting engine 95 and a model database 100. In some embodiments, the server memory 85 also stores weather data, such as the weather data described as being stored on the weather server 25.

The forecasting engine 95 generates one or more models for forecasting the drying of an agricultural crop. The forecasting engine 95 may generate the models based on training data. The training data may be received from, for example, multiple user devices 15 (for example, as feedback data). In some embodiments, the forecasting engine 95 generates the models using machine learning functions. Machine learning functions are generally functions that allow a computer application to learn without being explicitly programmed. In particular, a computer application performing machine learning functions (sometimes referred to as a learning engine) is configured to develop an algorithm based on training data. For example, to perform supervised learning, the training data includes example inputs and corresponding desired (for example, actual) outputs, and the forecasting engine 95 progressively develops a model that maps inputs to the outputs included in the training data. Machine learning may be performed using various type of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms.

Accordingly, the forecasting engine 95 in this example (as executed by the server electronic processor 80) performs machine learning using the received training data to develop a model that maps agricultural field parameters to drying forecasts for an agricultural crop. In some embodiments, the forecasting engine 95 generates different models for different crops, different climates, and the like. The models generated by the forecasting engine 95 may be stored in the model database 100. In some embodiments, the model database 100 is included in a separate device. Alternatively or in addition, the models generated by the forecasting engine 95 may be copied to one or more separate devices, such as other servers or databases external to the forecast server 20. For example, the models may be copied and transmitted (via the communication network 35) to the user device 15.

Accordingly, the server electronic processor 80 (with the forecasting engine 95) is configured to generate and apply one or more models to data (for example, the weather data, the agricultural field parameters, and the like) for forecasting the drying of an agricultural crop. Additionally, the server electronic processor 80 may generate and output a forecast for display to a user of the user device 15 (via the forecast application 55), as described above.

Figure 4:
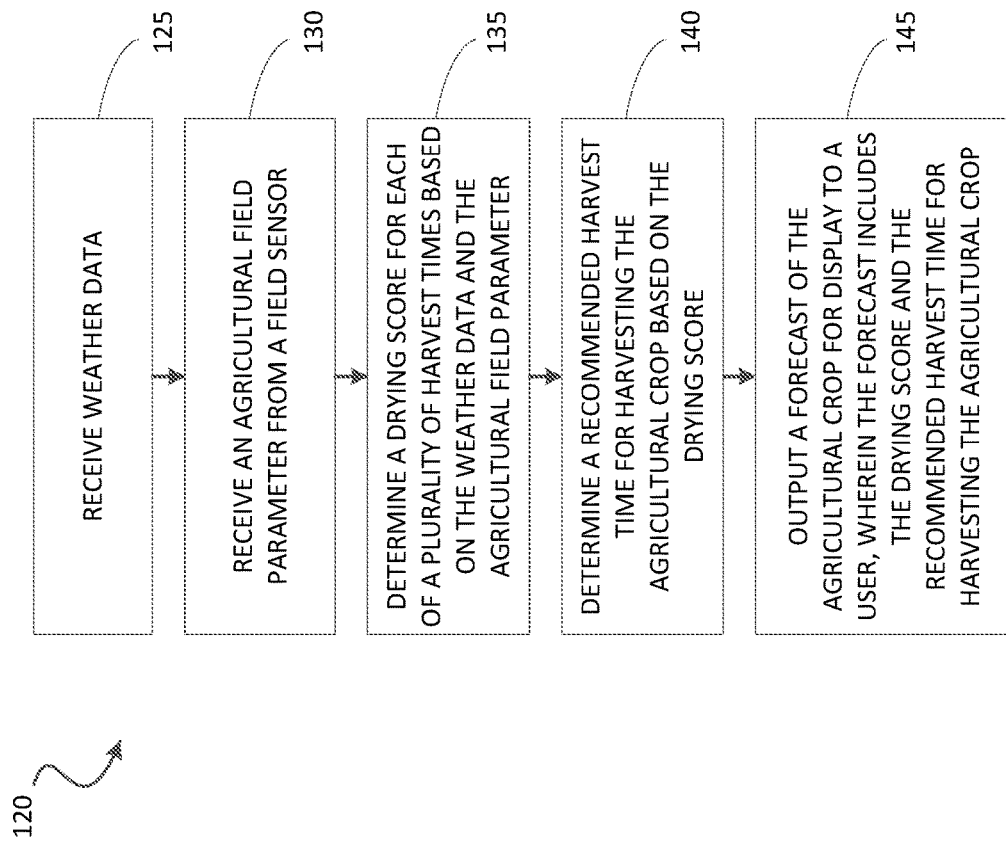
FIG. 4 is a flowchart illustrating a method for forecasting the drying of an agricultural crop performed by the system of FIG. 1 according to some embodiments.

In particular, the server electronic processor 80 executes instructions to perform the method 120 illustrated in FIG. 4 for forecasting the drying of an agricultural crop. As illustrated in FIG. 4, the method 120 includes receiving, with the server electronic processor 80, weather data (at block 125). The server electronic processor 80 receives the weather data from the weather server 25 via the server communication interface 90 of the forecast server 20. The weather data received by the server electronic processor 80 includes weather data associated with one or more agricultural fields, such as local weather forecasts, cloud coverage data, solar radiation data, wind speed data, and the like, as noted above.

In some embodiments, the weather data received by the server electronic processor 80 is stored in the server memory 85 of the forecast server 20.

The server electronic processor 80 also receives one or more agricultural field parameters (at block 130). The server electronic processor 80 receives the agricultural field parameters from the field sensors 30 via the server communication interface 90 of the forecast server 20. Alternatively or in addition, the server electronic processor 80 may receive the agricultural field parameters from the user device 15 (as user input). As noted above, the one or more agricultural field parameters may include, for example, moisture, solar radiation, cloud coverage, humidity, wind speed, and the like. In some embodiments, the agricultural field parameters received by the server electronic processor 80 are stored in the server memory 85 of the forecast server 20.

After the server electronic processor 80 receives the weather data and the agricultural field parameters, the server electronic processor 80 determines a drying score based on the weather data and the agricultural field parameter (at block 135). The drying score represents a rate of drying for an agricultural crop. As discussed above, the server electronic processor 80 is configured to calculate a drying score indicative of an expected level of dryness of the crop at each particular time based at least in part on an estimated pre-harvest rate of drying for an agricultural crop since a previous rainfall and a duration of time between the forecasted end of the previous rainfall and each particular time. For example, the drying score may be an hour-by-hour drying score, a day-by-day drying score, or the like. In some embodiments, the server electronic processor 80 determines the drying score by application of one or more models stored in the model database 100 of the server memory 85. In particular, the server electronic processor 80 may apply a model to the weather data and the agricultural field parameter. In other words, the server electronic processor 80 may access the models stored in the model database 100 of the server memory 85 and apply one or more models to the weather data and the agricultural field parameter (as received in block 125 and block 130) to determine the drying score.

In some embodiments, the drying score is represented as a positive value or a negative value depending on whether or not the agricultural crop is drying, as illustrated in the table below. For example, when the weather data and the agricultural field parameters indicate that drying of an agricultural crop will occur, the drying score will be a positive value. However, when the weather data and the agricultural field parameters indicate that drying of an agricultural crop will not occur, the drying score will be a negative value. For example, when the weather data indicates that precipitation is anticipated to occur at the agricultural field during a particular period of time, the server electronic processor 80 will determine a negative drying score for that particular period of time. Additionally, the magnitude of the drying score may be determined based on the rate (speed) at which the agricultural crop is predicted to dry (a positive drying score) or get wet (a negative drying score) for that particular period of time. In other words, the larger the magnitude of the drying score, the drier the agricultural crop is (a positive drying score) or the wetter the agricultural crop is (a negative drying score) during the period of time.

| Time Period | Drying Score | Probability of Success |
|---|---|---|
| 1:00 PM-2:00 PM | 5.0 | 80% |
| 2:00 PM-3:00 PM | 5.2 | 89% |
| 3:00 PM-4:00 PM | 5.5 | 90% |
| 4:00 PM-5:00 PM | 2.0 | 40% |
| 6:00 PM-7:00 PM | −1.2 | 0% |
| 7:00 PM-8:00 PM | −4.0 | 0% |

The server electronic processor 80 also determines a recommended harvest time for harvesting the agricultural crop based on the calculated drying score (at block 140). In some implementations, the server electronic processor 80 is configured to compare drying scores associated with different predefined periods of time to determine the recommended harvest time. For example, the server electronic processor 80 may determine which predefined period of time has the drying score with the largest positive magnitude and determine that predefined period of time as the recommended harvest time for harvesting the agricultural crop.

After determining the recommended harvest time for harvesting the agricultural crop, the server electronic processor 80 automatically outputs a forecast of the agricultural crop for display to a user (at block 145). The server electronic processor 80 may output the forecast through the server communication interface 90 over the communication network 35 to the user device 15. The user device 15 may display (via an output device of the user device 15) the forecast through the forecast application 55 to a user of the user device 15. As noted above, the forecast may be used by the user of the user device 15 to determine when it is most advantageous to harvest an agricultural crop.

Alternatively or in addition, in some embodiments, the server electronic processor 80 receives user input from the user device 15. A user of the user device 15 may provide the user input using an input device of the user device 15. The user input may relate to additional information impacting the drying of an agricultural crop. For example, the user input may include a location of the agricultural field, a soil type, a crop type, a crop yield, a size of the agricultural field, an identifier of the agricultural field, an angle and direction of ground slope of the agricultural field, and the like. Accordingly, in some embodiments, the server electronic processor 80 determines the drying score based on the user input. Additionally, the server electronic processor 80 may include the user input in the forecast output to the user via the forecast application 55.

Alternatively or in addition, in some embodiments, the server electronic processor 80 identifies a dry period based on the weather data received from the weather server 25. The dry period represents a future period of time with no anticipated precipitation at the agricultural field location. In other words, a dry period is a period of time between rains at the agricultural field. The server electronic processor 80 may determine a cumulative drying score for the identified dry period. The cumulative drying score represents a drying score associated with the dry period. In some embodiments, the server electronic processor 80 also determines a probability of success associated with the cumulative drying score. The probability of success associated with the cumulative drying score may indicate whether an agricultural crop will appropriately dry for harvesting of the agricultural crop before the next anticipated precipitation at the agricultural field. The server electronic processor 80 may output the forecast including the dry period, the cumulative drying score, or a combination thereof. Accordingly, based on the information included in the forecast displayed via the forecast application 55, a user may determine whether it is advantageous to harvest the agricultural crop during the dry period.

In some embodiments, the server electronic processor 80 receives a user-selected harvest time for harvesting the agricultural crop. The server electronic processor 80 may receive the user-selected harvest time from the user device 15. For example, the user of the user device 15 may input (via an input device of the user device 15) the user-selected harvest time. The user-selected harvest time may represent a future point in time that the user wants to harvest an agricultural crop. Upon receiving the user-selected harvest time, the server electronic processor 80 may determine a drying score for the user-selected harvest time, as similarly described above. In some embodiments, the server electronic processor 80 determines a probability of success for the user-selected harvest time. The probability of success for the user-selected harvest time may indicate the likelihood that the agricultural crop will be sufficiently dry and ready for harvesting at the user-selected harvest time. The forecast output to the user (via the forecast application 55) by the server electronic processor 80 may include the user-selected harvest time, the drying score for the user-selected harvest time, the probability of success for the user-selected harvest time, or a combination thereof. Based on the information included in the forecast, the user of the forecast application 55 may determine whether or not the user-selected harvest time is an advantageous point in time to harvest the agricultural crop.

Figure 5:
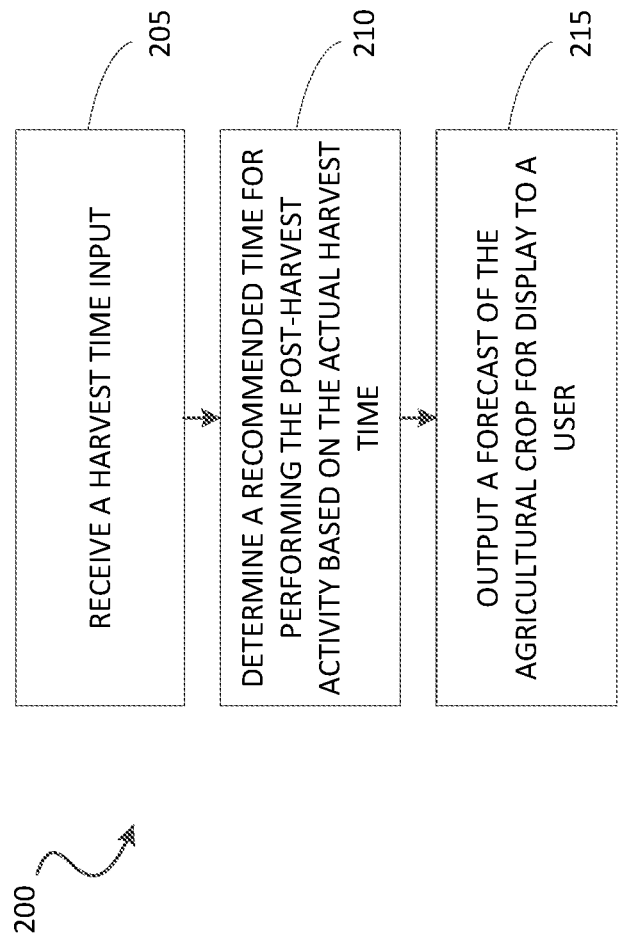
FIG. 5 is a flowchart illustrating a method for forecasting when to perform post-harvest activities performed by the system of FIG. 1 according to some embodiments.

For some other types of agricultural crops, the crop is allowed to dry after it is cut (i.e., evaporation of internal moisture in the crop) before performing post-harvest activities such as raking and baling. In some implementations, the system is configured to determine a recommended time for performing these post-harvest activities using similar collected data as discussed in the examples above. In one particular example, the server electronic processor 80 executes instructions to perform the method 200 illustrated in FIG. 5 for forecasting when to perform post-harvest activities. As illustrated in FIG. 5, the server electronic processor 80 receives the actual harvest time from the user device 15 (over the communication network 35) (at block 205). For example, the user may input (via an input device of the user device 15) an actual harvest time indicating when the agricultural crop was harvested (or will be harvested). The server electronic processor 80 then determines a recommended time for performing the post-harvest activity based on the actual harvest time (at block 210). In some embodiments, the recommended time for performing the post-harvest activity is determined based on an estimated rate of drying for the cut agricultural crop and an estimated amount of drying time needed to obtain a necessary level of dryness for the post-harvest activities. In some implementations, the server electronic processor 80 determines the estimated rate of drying and the estimate amount of drying time needed in view of weather forecast information indicating, for example, moisture levels/humidity, expected periods/duration of rainfall, etc. The server electronic processor 80 may include the post-harvest activity, the recommended time for performing the post-harvest activity, or a combination thereof in the forecast output to the user via the user device 15 (the forecast application 55). After determining the recommended time for performing the post-harvest activity, the server electronic processor 80 outputs a forecast of the agricultural crop for display to the user (at block 215). The forecast output by the server electronic processor 80 may include the recommended time for performing the post-harvest activity. In some embodiments, the forecast includes additional information relating to performing a post-harvest activity, such as a probability of success for the recommended time. In some implementations, the system not only displays the recommended time for performing the post-harvest activity, but also (or instead) outputs a listing of a plurality of different possible times for performing the post-harvest activity and a score indicative of the relative expected dryness levels of the cut agricultural crop at each particular time (similar to the "drying score" calculation discussed above). Accordingly, the user of the forecast application 55 may use the information included in the forecast to help predict when the harvested agricultural crop will be sufficiently dry and ready for post-harvest activities, such as raking and baling.

In some implementations, the forecast application 55 is configured to provide a forecast relating to pre-harvest activities for an agricultural crop. A pre-harvest activity may include, for example, watering, fertilizing, applying a pesticide, and the like. For example, the forecast application 55 may determine a recommended time to perform a pre-harvest activity and output a forecast including the recommended time to perform the pre-harvest activity for display to a user. In various different implementations, the system may be configured to calculate and output the forecast for "pre-harvest" activities in addition to or instead of the forecast for post-harvest activities and/or the dryness scores/recommended harvest time.

Furthermore, in still other implementations, the system may be configured to consider both an estimated dryness level at the time of harvesting and an estimated dryness level for post-harvest activities (for example, raking, baling, and the like). For example, the system may be configured to calculate a "drying score" that is indicative of an expected level of dryness for several different possible harvesting times and whether the cut agriculture crop will be able to dry sufficiently for the post-harvesting activity before the next forecasted rainfall. In other examples, the system may be configured to calculate a "drying score" for each possible harvesting time based only on the expected level of dryness of the crop during harvesting, but will also output an estimated time of when the agricultural crop will be ready for the post-harvest activity if it is cut at the particular harvest time (for example, if the crop is cut at 10 am, what day/time will the cut crop be ready for raking/baling?).

As noted above, the server electronic processor 80 may determine the drying score by applying one or more models stored in the model database 100 of the server memory 85. As also noted above, the models stored in the model database 100 are generated based on training data received from one or more external devices, such as one or more user devices 15. Accordingly, in some embodiments, the server electronic processor 80 receives user feedback data. The server electronic processor 80 may receive the user feedback data from the user device 15. The user feedback data relates to the harvest of the agricultural crop. For example, the user feedback data may include an actual harvest time indicating when the agricultural crop was harvested, a dryness of the agricultural crop at the actual harvest time, a dryness of the agricultural crop when a post-harvest activity was performed, an amount of time for the agricultural crop to dry after harvesting the agricultural crop, other user feedback data, or a combination thereof. In other words, the user may indicate to the server electronic processor 80 (via the feedback data) how accurate the information included in the forecast was, such as the drying score. Based on the received user feedback data, the server electronic processor 80 may update the models stored in the model database 100 (for example, improve the accuracy of the information included in the forecast, such as the drying scores).

In some embodiments, the training data used to generate the models stored in the model database 100 includes secondary user feedback data. Secondary user feedback data may include data provided by and collected from other secondary users, such as other local farmers. The secondary user feedback data may be used in addition to or as an alternative to the user feedback data when training the models stored in the model database 100. In some embodiments, the secondary user feedback data is included in the forecast outputted to a user. For example, the secondary user feedback data may be displayed as a heat map of local secondary users who are engaged in or completed a particular agricultural operation, such as harvesting the agricultural crop. In some instances, the secondary user feedback data may be presented in the forecast as an average (for example, a percentage) of secondary users who are currently performing an agricultural operation, an average success rate of secondary users who recently performed an agricultural operation, and the like. Additionally, the secondary user feedback data may include a particular agricultural field location, an identification of a secondary user, a success rating of the secondary user, other information pertaining to the secondary user, or a combination thereof.

In some embodiments, the forecasting application 55 may be used by a user (via the user device 15) to control an agricultural machine (for example, an autonomous agricultural machine). In such embodiments, the user device 15 may be in communication (via the communication network 35) with the agricultural machine (for example, a control system of the agricultural machine). Using the forecasting application 55, the user may control the agricultural machine to perform a pre-harvesting activity, a harvesting activity, a post-harvesting activity, or a combination thereof. The user may interact with the forecasting application 55 to transmit a harvest command to the agricultural machine. For example, the user may interact with the forecasting application 55 to select a harvest activity to be performed by the agricultural machine, a time for performing the harvest activity, and the like. For example, when the forecast indicates a recommended time to harvest an agricultural crop, the user may interact with the forecasting application 55 to select the recommended time and the corresponding harvest activity. In response to the user selecting the recommended time and the corresponding harvest activity, the forecasting application 55 may transmit the user's selections to the agricultural machine. When the agricultural machine (for example, a control system of the agricultural machine) receives the user's selections, the agricultural machine performs the selected harvest activity at the selected time (for example, the recommended time).

Alternatively or in addition, the forecasting application 55 may automatically control the agricultural machine. For example, when the forecast includes a recommended time to harvest the agricultural crop, the forecasting application 55 may automatically transmit the recommended time to the agricultural machine. Upon receipt of the recommended time, the agricultural machine may automatically harvest the agricultural crop at the recommended time. In some embodiments, the forecasting application 55 only automatically controls the agricultural machine based on the probability of success for a recommended time to harvest the agricultural crop. The forecasting application 55 may only automatically control the agricultural machine when the probability of success for the recommended time to harvest is greater than or equal to a predetermined threshold. For example, when the forecast indicates that the recommended time to harvest the agricultural crop has a probability of success that is greater than or equal to 90%, the forecasting application 55 may automatically control the agricultural machine to harvest the agricultural crop at the recommended time.

Although the methods and systems described herein are described as relating to forecasting the drying of an agricultural product, it should be understood that the methods and systems described herein may be applied to other agricultural activities in addition to or alternatively to forecasting the drying of an agricultural crop. Although the methods and systems described herein are described as relating to an agricultural crop that is ultimately harvested, such as hay, it should be understood that the methods and systems described herein may be applied to other agricultural crops, such as grass.

Thus, the invention provides, among other things, methods and systems for forecasting the drying of an agricultural product, such as hay.

What is claimed is:

1. A system for forecasting the drying of an agricultural crop, the system comprising:
an electronic processor configured to receive weather data associated with an agricultural field,
receive an agricultural field parameter from a field sensor associated with the agricultural field,
determine a drying score for each of a plurality of harvest times based on the weather data and the agricultural field parameter, wherein determining the drying score for each of the plurality of harvest times includes applying a model to the weather data and the agricultural field parameter, wherein the model is generated using a machine learning function,
determine a recommended harvest time for harvesting the agricultural crop based on the drying score, wherein the recommended harvest time is included in the plurality of harvest times,
determine a probability of success for at least one harvest time of the plurality of harvest times, wherein the probability of success is indicative of a predicted probability that the agricultural crop in the agricultural field will be completely harvested before a predicted change in weather conditions if harvesting is started at the at least one harvest time,
output a forecast for the agricultural crop for display to a user, wherein the forecast includes the drying score, the recommended harvest time for harvesting the agricultural crop, and the probability of success for the at least one harvest time,
receive an actual harvest time indicating when the agricultural crop was cut and the cut agricultural crop was left in the agricultural field for further drying,
determine a cut crop drying score for each of a plurality of times after the actual harvest time based on the weather data and the agricultural field parameter,
determine a recommended time for collecting the cut agricultural crop from the field based on the actual harvest time and the cut crop drying score, and
output, for display to a user, a visual indication of the recommended time for collecting the cut agricultural crop.

2. The system of claim 1, wherein the field sensor is at least one selected from a group consisting of a humidity sensor, a moisture sensor, a temperature sensor, a wind sensor, and a soil sensor.

3. The system of claim 1, wherein the field sensor is positioned on a mobile monitoring device configured to monitor the agricultural field, wherein the mobile monitoring device includes at least one selected from a group consisting of an aerial monitoring vehicle and a surface monitoring vehicle.

4. The system of claim 1, wherein the electronic processor is further configured to identify a dry period based on the weather data, wherein the dry period represents a future period of time with no anticipated precipitation at the agricultural field and determine a cumulative drying score for the dry period, wherein the forecast includes the dry period and the cumulative drying score for the dry period.

5. The system of claim 1, wherein the electronic processor is further configured to receive a user input and determine the drying score based on the user input, wherein the forecast includes the user input.

6. The system of claim 5, wherein the user input includes at least one selected from a group consisting of a location of the agricultural field, a soil type, a crop type, a crop yield, a size of the agricultural field, an identifier of the agricultural field, and an angle and direction of ground slope of the agricultural field.

7. The system of claim 1, wherein the electronic processor is further configured to automatically operate the agricultural machine to begin harvesting the agricultural crop based on the forecast.

8. The system of claim 1, wherein the electronic processor is further configured to receive user feedback data relating to the harvest of the agricultural crop; and
update the model based on the user feedback data,
wherein receiving user feedback data includes receiving at least one selected from a group consisting of an actual harvest time indicating when the agricultural crop was harvested, a dryness of the agricultural crop at the actual harvest time, a dryness of the agricultural crop when a post-harvest activity was performed, and an amount of time for the agricultural crop to dry after harvesting the agricultural crop.

9. A system for forecasting the drying of an agricultural crop, the system comprising:
an electronic processor configured to receive weather data associated with an agricultural field,
receive an agricultural field parameter from a field sensor associated with the agricultural field,
determine a drying score for each of a plurality of harvest times based on the weather data and the agricultural field parameter, wherein determining the drying score for each of the plurality of harvest times includes applying a model to the weather data and the agricultural field parameter,
determine a recommended harvest time for harvesting the agricultural crop based on the drying score, wherein the recommended harvest time is included in the plurality of harvest times, wherein harvesting the agricultural crop includes cutting the agricultural crop, leaving the cut agricultural crop in the agricultural field for further drying, and collecting the cut agricultural crop from the agricultural field when the cut agricultural crop reaches a desired level of dryness,
determine a probability of success for at least one harvest time of the plurality of harvest times, wherein the probability of success is indicative of a predicted probability that the agricultural crop in the agricultural field will be completely harvested before a predicted change in weather conditions if harvesting is started at the at least one harvest time, wherein the electronic processor is configured to determine the probability of success for the at least one harvest time of the plurality of harvest times by estimating a continued rate of drying of the cut agricultural crop if the agricultural crop is cut at the at least one harvest time, determining a start time of a next predicted rainfall after the at least one harvest time based on the weather data, and determining, based on the estimated continued rate of drying, a probability that the cut agricultural crop will reach the desired level of dryness before the start time of the next predicted rainfall, and output a forecast for the agricultural crop for display to a user, wherein the forecast includes the drying score, the recommended harvest time for harvesting the agricultural crop, and the probability of success for the at least one harvest time.

10. The system of claim 9, wherein the electronic processor is further configured to receive a user-selected harvest time for harvesting the agricultural crop and determine a drying score for the user-selected harvest time, wherein the forecast includes the user-selected harvest time and the drying score for the user-selected harvest time.

11. The system of claim 10, wherein the electronic processor is configured to determine the probability of success for the at least one harvest time by determining a probability of success for the user-selected harvest time, wherein the forecast includes the probability of success for the user-selected harvest time.

12. The system of claim 9, wherein the electronic processor is further configured to automatically operate the agricultural machine to begin harvesting the agricultural crop based on the forecast.

13. The system of claim 9, wherein the electronic processor is further configured to receive user feedback data relating to the harvest of the agricultural crop; and update the model based on the user feedback data, wherein receiving user feedback data includes receiving at least one selected from a group consisting of an actual harvest time indicating when the agricultural crop was harvested, a dryness of the agricultural crop at the actual harvest time, a dryness of the agricultural crop when a post-harvest activity was performed, and an amount of time for the agricultural crop to dry after harvesting the agricultural crop.

14. A method for forecasting the drying of an agricultural crop, the method comprising:

receiving, with an electronic processor, weather data associated with an agricultural field;

receiving, with the electronic processor, an agricultural field parameter from a field sensor associated with the agricultural field;

determining, with the electronic processor, a drying score for each of a plurality of harvest times based on the weather data and the agricultural field parameter, wherein determining the drying score for each of the plurality of harvest times includes applying a model to the weather data and the agricultural field parameter, wherein the model is generated using a machine learning function;

determining, with the electronic processor, a recommended harvest time for harvesting the agricultural crop based on the drying score, wherein the recommended harvest time is included in the plurality of harvest times, wherein harvesting the agricultural crop includes cutting the agricultural crop, leaving the cut agricultural crop in the agricultural field for further drying, and collecting the cut agricultural crop from the agricultural field when the cut agricultural crop reaches a desired level of dryness;

determining, with the electronic processor, a probability of success for at least one harvest time of the plurality of harvest times, wherein the probability of success is indicative of a predicted probability that harvesting of the agricultural crop in the agricultural field will be successfully completed before a predicted change in weather conditions if harvesting is started at the at least one harvest time, wherein determining the probability of success for the at least one harvest time of the plurality of harvest times includes estimating a continued rate of drying of the cut agricultural crop if the agricultural crop is cut at the at least one harvest time, determining a start time of a next predicted rainfall after the at least one harvest time based on the weather data, and determining, based on the estimated continued rate of drying, a probability that the cut agricultural crop will reach the desired level of dryness before the start time of the next predicted rainfall;

outputting, with the electronic processor, a forecast of the agricultural crop for display to a user, wherein the forecast includes the drying score, the recommended harvest time for harvesting the agricultural crop, and the probability of success for the at least one harvest time; and harvesting the agricultural crop at the recommended harvest time based on the forecast.

15. The method of claim 14, further comprising:

receiving a user-selected harvest time for harvesting the agricultural crop; and determining a drying score for the user-selected harvest time, wherein determining the probability of success for the at least one harvest time includes determining a probability of success for the user-selected harvest time in response to receiving the user-selected harvest time.

16. The method of claim 14, further comprising:

receiving an actual harvest time indicating when the agricultural crop was harvested; and determining a recommended time for performing a post-harvest activity based on the actual harvest time, wherein outputting the forecast includes outputting the forecast including the recommended time for performing the post-harvest activity.

17. The method of claim 14, further comprising:

identifying a dry period based on the weather data, wherein the dry period represents a future period of time with no anticipated precipitation at the agricultural field; and determining a cumulative drying score for the dry period, wherein outputting the forecast includes outputting the forecast including the dry period and the cumulative drying score for the dry period.

18. The method of claim 14, further comprising:

receiving a user input; and determining the drying score based on the user input, wherein outputting the forecast includes outputting the forecast including the user input.

19. The method of claim 18, further comprising:

automatically operating an agricultural machine to begin harvesting the agricultural crop based on the forecast.

20. The method of claim 14, further comprising:
receiving user feedback data relating to the harvest of the agricultural crop; and
updating the model based on the user feedback data,
wherein receiving user feedback data includes receiving at least one selected from a group consisting of an actual harvest time indicating when the agricultural crop was harvested, a dryness of the agricultural crop at the actual harvest time, a dryness of the agricultural crop when a post-harvest activity was performed, and an amount of time for the agricultural crop to dry after harvesting the agricultural crop.

\* \* \* \* \*